MODULATION BY MAGNETIC CONTROL OF SUPERCONDUCTORS

Filed June 20, 1949

Inventors
E. A. Ericsson
A. O. Jorgensen
S. L. Overby
By Glascock Downing Seebold
Attys.

Patented Nov. 17, 1953 2,659,868

UNITED STATES PATENT OFFICE 2,659,868

MODULATION BY MAGNETIC CONTROL OF SUPERCONDUCTORS

Eric Arvid Ericsson, Stockholm, Anders Ossian Jörgensen, Traneberg, and Sune Lambert Överby, Stockholm, Sweden, assignors to Telefonaktiebolaget L M Ericsson, Stockholm, Sweden, a company of Sweden Application June 20, 1949, Serial No. 100,204

Claims priority, application Sweden July 9, 1948

4 Claims. (Cl. 332—51)

The following methods are known for the modulation of a sinusoidal alternating voltage:

Amplitude modulation (AM)
Frequency modulation (FM)
Phase modulation (FasM)
Impulse modulation (PM)

Impulse modulation can be produced in many different ways, as amplitude modulation, frequency modulation, impulse position modulation, time modulation, etc.

Common to all these kinds of modulations is the fact, that the modulation process takes place in a controlling, often electronic member, to which two alternating voltages, a carrier frequency and a modulation frequency, are fed. Said two frequencies are combined in the guiding member, so that the desired kind of modulation is obtained. Electron tubes, dry rectifiers, magnetic circuits etc., have been used until now for the said purposes in combination with passive electric impedance elements.

According to the present invention, all kinds of modulations, which are possible with for example electron tubes, can also be obtained with variable high conductivity elements controlled by magnetic fields or by changes of temperature at constant magnetic field. The principles of the modulator will be described below. It is characteristic of the invention, that said modulator uses the transition curve, which is typical for variable high conductivity, and in which the electrical conducting properties decrease from a very great value (nearly infinite) to a value having about the same magnitude as the conducting property of Ag.

Figure 1:
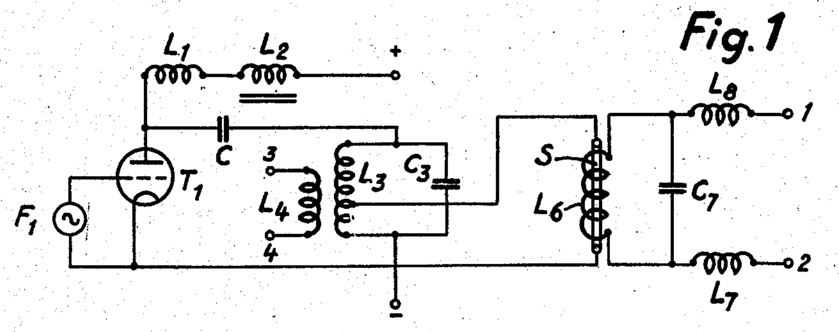

The invention will be described more clearly with reference to the accompanying drawing, in which Fig. 1 shows an arrangement for amplitude modulation and Figs. 2–4 different arrangements for impulse modulation.

In using variable high conductivity elements, the variable high conductivity element is linked in an electrical network consisting of, for example, a tube generator or amplifier fed with constant carrier frequency in the same way as is the case with tube modulators for AM. Fig. 1 shows an embodiment for amplitude modulation. An amplifier tube $T_1$ is fed with a carrier frequency $f_1$ from a generator $F_1$. In its anode circuit there are coils $L_1$ and $L_2$ having a high reactance at carrier frequency and modulation frequency $f_m$. Shunted across the tube between the anode and cathode, there is an oscillating circuit consisting of a coil $L_3$ and a condenser $C_3$, which oscillating circuit, as regards direct current, is separated from the anode direct current by means of a large capacity C. The output effect is obtained by means of a coupling coil $L_4$ from the circuit $L_3C_3$ over the output terminals 3, 4. A variable high conductivity element S controlled by the magnetic field from a coil $L_6$, is connected over a portion of $L_3$. The coil $L_6$ is fed with a modulation frequency $f_m$, fed at a pair of terminals 1, 2. In series with $L_6$ there is a low-pass filter $C_7L_7L_8$ consisting of a shunt condenser $C_7$ and two coils $L_7L_8$ in series, which prevents $f_1$ from returning backwards to the pair of terminals 1, 2. Due to the varying of the resistance of the variable high conductivity element with the frequency $f_m$, the impedance of the circuit $C_3L_3$ also varies, the result being, that the effect taken from $L_4$ at the pair of terminals 3, 4 is amplitude modulated.

Figure 2:
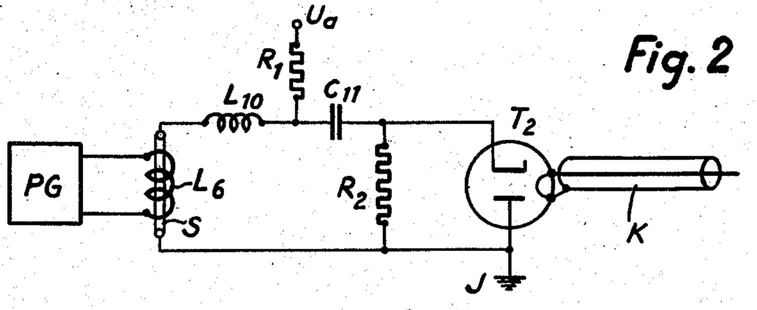
Figure 3:
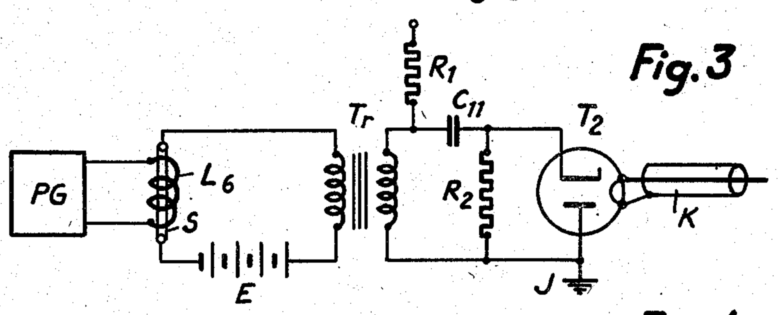
Figure 4:
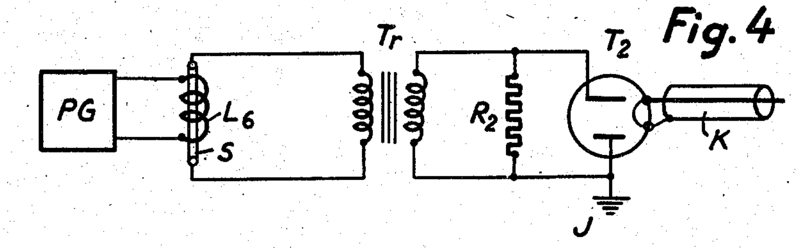

Figs. 2–4 show different arrangements for impulse modulation of ultra high frequencies by means of a variable high conductivity element. It is supposed, that the primary oscillation generator is a magnetron $T_2$, as for example a cavity magnetron or a multicavity magnetron able to generate very high impulse effects. An impulse generator PG generates a square impulse having a desired duration of about a micro-second and a low repetition frequency. The impulse generator PG magnetically controls a variable high conductivity element S, linked in a controlling circuit for the magnetron $T_2$. A constant, high direct voltage is supplied to a terminal $u_a$, which voltage can momentarily charge a condenser $C_{11}$ over a resistance $R_1$ during the periods, when the variable high conductivity element has high conductivity. An impulse from PG causes a quick discharge of $C_{11}$ across the magnetron $T_2$, whereby a coil $L_{10}$ gives the wave front a suitable shape. The magnetron oscillates with high frequency while being fed with current, the value of the frequency depending upon the resonance circuit or circuits belonging to the magnetron, such as resonance cavities, wave guide or coaxial lines, in a well known manner. The impulse effect is taken out by means of a coaxial line K.

In Fig. 2 a direct impulse modulation of a magnetron with a variable high conductivity element S as controlling member is shown. In Figs. 3 and 4 an impulse transformer $T_r$ is connected between the magnetron circuit and the superconductor for better matching between the variable high conductivity element and the magnetron during the impulsing periods. A high impulsing effect can here be obtained, due to the possibility of better matching the variable high conductivity element and magnetron impedances. Such a matching can also be obtained by means of an impedance network of capacitances and inductances.

In the circuits according to Figs. 3 and 4, a source E of direct current is connected in series with a variable high conductivity element. The charging circuit is arranged in Fig. 3 in the same manner as in Fig. 2, but in Fig. 4 the impulses are transmitted directly from the variable high conductivity element to the magnetron without the help of a discharge circuit. It is then necessary, that the impulses from the variable high conductivity element shall be stronger than in the circuit according to Figs. 2 and 3. In all the cases according to Figs. 2, 3 and 4, a resistance $R_2$ is connected between the electrodes of the magnetron to fix the potentials on the plates of the condenser $C_{11}$, which is connected to one of the electrodes of the magnetron. The other electrode is connected to ground at J.

We claim:

1. A modulation system for modulating high frequency currents comprising an oscillating circuit including at least one inductance coil, a power tube connected to the output of said oscillating circuit, a resistance connected across the electrodes of the power tube, a co-axial line connected to the output of said power tube, a variable high conductivity magnetically responsive element in said oscillating circuit, a coil in inductive relationship with said latter element, and a source of alternating electro-motive force at carrier frequency connected to said latter coil for varying the conductivity of the variable high conductivity element.

2. A modulation system for modulating high frequency currents comprising an oscillating circuit including a condenser and an inductance coil in series, a power tube connected to the output of said oscillating circuit, a resistance connected across the electrodes of the power tube, a co-axial line connected to the output of said power tube, a variable high conductivity magnetically responsive element in said oscillating circuit, a coil in inductive relationship to said latter element, a source of alternating electromotive force at carrier frequency connected to said latter coil for varying the conductivity of the variable high conductivity element, and a charging circuit for said condenser.

3. A modulation system for modulating high frequency currents comprising an oscillating circuit including a transformer, a power tube, a condenser connected in series with the secondary of said transformer and the input electrodes of said power tube, a resistance connected across the electrodes of the power tube, a charging circuit for said condenser, a source of electro-motive force and a variable high conductivity magnetically responsive element in series in the primary circuit of said transformer, a coil in inductive relationship with said latter element, and a source of alternating electro-motive force at carrier frequency connected to said latter coil for varying the conductivity of the variable high conductivity element.

4. A modulation system for modulating high frequency currents comprising an oscillating circuit including a transformer, a power tube connected to the secondary of said transformer, a resistance connected across the electrodes of the power tube, a co-axial line connected to the output of said power tube, a variable high conductivity magnetically responsive element in series in the primary circuit of said transformer, a coil in inductive relationship with said latter element, and a source of alternating electro-motive force at carrier frequency connected to said latter coil for varying the conductivity of the variable high conductivity element.

ERIC ARVID ERICSSON.
ANDERS OSSIAN JÖRGENSEN.
SUNE LAMBERT ÖVERBY.

References Cited in the file of this patent

UNITED STATES PATENTS

| Number | Name | Date |
|---|---|---|
| 1,609,748 | Weinberger | Dec. 7, 1926 |
| 2,043,448 | Schuchter | June 9, 1936 |
| 2,382,615 | Donley | Aug. 14, 1945 |
| 2,407,293 | Shepherd | Sept. 10, 1946 |
| 2,418,842 | Kinsburg | Apr. 15, 1947 |
| 2,483,818 | Evans | Oct. 4, 1949 |
| 2,549,775 | Charchain et al. | Apr. 24, 1951 |
| 2,629,079 | Miller | Feb. 17, 1953 |

FOREIGN PATENTS

| Number | Country | Date |
|---|---|---|
| 903,364 | France | Oct. 1, 1945 |